Patented June 7, 1949

2,472,635

UNITED STATES PATENT OFFICE 2,472,635

METHOD FOR INHIBITING ACID ATTACK ON BRICK

Martin K. Weber, Berkeley, and Charles R. Nelson, San Carlos, Calif., assignors to Shell Development Company, San Francisco, Calif., a corporation of Delaware No Drawing. Application November 3, 1947, Serial No. 783,850

7 Claims. (Cl. 252—145)

This invention relates to a method for inhibiting the attack made by acids on the surfaces of various bricks and other fired siliceous products, including various glass and ceramic materials.

Many chemical processes require that a body of acid be confined for relatively long periods of time within a vessel, such as the reaction chamber of a processing unit or in various conduits. The problem then becomes one of containing the acid while preventing any substantial corrosion or deterioration by it of the adjacent wall surfaces. In some instances, notably when the acid is relatively dilute and is employed at lower temperatures without agitation, this problem is met by fabricating the vessel of copper or other acid-resistant metal. However, under more severe conditions it becomes necessary to employ further protective measures, and one of the most common of these is to line the vessel with a fired siliceous product, and preferably with bricks of a type which are attacked by acids only with difficulty. Such bricks are normally manufactured from clays of the alumina-silica type, and while they are known in the trade as "acid-proof" bricks, this is a misnomer, and on exposure to concentrated acid solutions or to those which are hot and/or turbulent, even acid-proof bricks are eaten away at a relatively rapid rate. This is undesirable for it leads to a premature dismantling of the equipment for repairs, and frequently makes the process impractical of operation.

It is therefore an object of this invention to provide a method for inhibiting the corrosive attack by acid solutions on brick surfaces, including those of the acid-proof type, as well as on the surfaces of other fired siliceous products. A further object is to reduce the attack normally made on brick surfaces by hot, concentrated acid solutions even when the latter are subjected to constant agitation. Still other objects of the invention will become apparent from the following discussion.

It has been discovered that the attack by acid solutions on brick and other fired clay surfaces coming in contact therewith may either be eliminated or reduced to negligible proportions by incorporating in the acid solution an aluminum oxide-containing additive. This may be aluminum oxide, in either the hydrated or unhydrated form, or it may be an aluminum oxide-containing material such as kaolin, whose formula is substantially $Al_2O_3.2SiO_2.2H_2O$. In the case of bricks and other products made from clays, however, the acid additive is preferably a material having the same general composition as the brick or other clay product to be protected from acid attack. The various clays, including those employed in making brick, contain substantial proportions of aluminum oxide, a representative clay brick of the acid-proof type, Knight 6V body acid-proof clay brick, for example, having the composition:

| | Per cent |
|---|---|
| $SiO_2$ | 66.7 |
| $Al_2O_3$ | 24.1 |
| $Fe_2O_3$ | 1.8 |
| MgO | .7 |
| CaO | .2 |
| $TiO_2$ | 1.5 |
| $K_2O-Na_2O$ | 2.8 |
| Remainder | 1.8 |

Accordingly, inasmuch as the various additives here proposed, including brick materials themselves, kaolin, and aluminum oxide, are either made up entirely of aluminum oxide or contain substantial amounts of that material, they are generically referred to as "aluminum oxide-containing additives."

The additives discussed in the foregoing paragraph may be supplied to the acid solution in either the dry state, in liquid-slurry form, or in any other readily soluble or dispersable condition. If dry, they preferably are added to the solution in the finely divided state, i. e., of a fineness to pass through a screen of 200 mesh.

It has been found that at least 0.1% of the aluminum oxide-containing additive, expressed on a dry weight basis and in terms of the weight of the acid solution, should be employed, and preferably the amount used ranges from 0.75 to 5% by weight of the acid solution. While somewhat larger amounts than this may be added without harmful result in perhaps most instances, the use of such larger proportions gives rise to the danger of reducing the strength and efficiency of the acid solution through interaction with the additive, thereby interfering with the practice of any process in connection with which the acid solution may be employed. Further, the addition of even smaller amounts than 0.1% of the aluminum oxide-containing additive will prove somewhat beneficial in most instances, though here the reduction in acid attack will by no means be as marked as would otherwise be the case.

The method of this invention may be successfully practiced with a wide variety of acid solutions, including sulfuric acid, phosphoric acid ($H_3PO_4$), nitric acid and hydrochloric acid. Even when such acids are employed in concentrations as great as 90 to 95%, and at temperatures above 200 or 300° C., introduction of the aluminum oxide-containing additive effectively prevents substantially all attack by the acid of adjacent brick or other siliceous surfaces. The same holds true even when the acid solution is of a highly turbulent one.

Employment of the additive here described is without apparent harmful effect on any process with which the acid may be utilized.

The following examples illustrate the manner in which the present invention finds application.

Example I

Ethanol was produced by passing ethylene and water upwardly through a 65% phosphoric acid solution maintained at approximately 265° C. and under a pressure between 1100 and 1350 p. s. i. g. Sections of Knight 6V body acidproof clay bricks measuring ½ x 1 x 4 inches were placed in the solution both below the point of admittance of the reactants, a relatively quiet zone, as well as in the turbulent portion above said point. After the unit has been in operation for 6 days, measurements made on the bricks disposed in the upper, or more turbulent acid zone disclosed a brick face loss equivalent to 14 inches per year, whereas the face loss of the bricks in the lower and more quiet portion of the acid solution was equivalent to from 0.3 to 0.6 inch per year.

An operation was now conducted under the same conditions of reaction described in the foregoing paragraph, but with the addition to the acid of a quantity of 1.25% by weight of powdered (200 mesh) Knight 6V body acid-proof clay brick material. Here the brick specimens, measuring ¾ x 1½ x 8 inches, were placed only in the upper, or turbulent, zone of the powdered brick-containing acid solution. At the conclusion of 5.2 days of operation, it was found that the brick specimens had suffered a face loss equivalent to but 0.3 to 0.5 inch per year, this comparing with a loss equivalent to 14 inches per year in the case of the acid solution having no additive. The efficiency of the ethanol production process carried out in the presence of the powdered brick material was the same as that conducted in the absence of said material.

Example II

This operation was one conducted using a 1 liter copper-lined bomb equipped with a magnetically operated stirrer. In the bomb were placed 700 ml. of 65% $H_3PO_4$, together with a specimen of Knight 6V body clay brick measuring ½ x ½ x 1¼ inches. Nitrogen was charged into the bomb and a pressure of 800 to 1000 p. s. i. g. so established therein. The bomb was then maintained at a temperature of from 250 to 280° C. for 21 hours, the acid being continuously stirred during this interval. At the conclusion of the test, the brick specimen evidenced a face loss equivalent to 4.7 inches per year.

Another operation was now conducted under the same conditions as described in the foregoing paragraph except that here the heating period was extended to 32 hours and 1.02% by weight of powdered brick (200 mesh Knight 6V body acid-proof clay brick) was added to the acid solution. In this case the face loss of the brick specimen was reduced to an amount equivalent to less than 0.1 inch per year.

Example III

This test was conducted under the same general conditions as described in Example II, the first paragraph, though here 1.02% by weight of colloidal kaolin was added to the solution, and the heating was continued for 24 hours. The face loss experienced by the brick specimen was equivalent to less than 0.1 inch per year.

Example IV

In this operation, likewise conducted under the conditions of Example II, 0.48% by weight of $Al(OH)_3$ was introduced into the acid and the resulting solution heated for 22 hours. The face loss of the brick sample in this solution was equivalent to 0.2 inch per year.

While the process of this invention has been more particularly described as it relates to the inhibition of corrosion by acids on various brick materials, it is equally effective when practiced in connection with tiles and other fired clay products.

We claim as our invention:

1. In a method for preventing attack on brick surfaces consisting essentially of fired siliceous products by an acid solution coming into contact therewith, the step comprising adding to said solution a quantity of from 0.75 to 5% by weight of a powdered brick material having the same general composition as that of the bricks forming said surfaces.

2. In a method for preventing attack on brick surfaces consisting essentially of fired siliceous products by an acid solution coming into contact therewith, the step comprising adding to said solution a quantity of from 0.75 to 5% by weight of kaolin in a finely divided state.

3. In a method for preventing attack on brick surfaces consisting essentially of fired siliceous products by an acid solution coming into contact therewith, the step comprising adding to said solution a quantity of from 0.1 to 5% by weight of a brick material having the same general composition as that of the bricks forming said surfaces.

4. In a method for preventing attack on brick surfaces consisting essentially of fired siliceous products by an acid solution coming into contact therewith, the step comprising adding to said solution a quantity of from 0.1 to 5% by weight of kaolin.

5. In a method for preventing attack on brick surfaces consisting essentially of fired siliceous products by an acid solution coming into contact therewith, the step comprising adding to said solution a quantity of from 0.1 to 5% by weight of aluminum oxide.

6. In a method for preventing attack on brick surfaces consisting essentially of siliceous material by an acid solution coming into contact therewith, the step comprising supplying to said solution a quantity of from 0.1 to 5% by weight of an additive selected from the group consisting of aluminum oxide and aluminum oxide-containing clays.

7. In a method for preventing attack on the surfaces of fired siliceous products by an acid solution coming into contact therewith, the step comprising supplying to said solution a quantity of from 0.1 to 5% by weight of an additive selected from the group consisting of aluminum oxide, and aluminum oxide-containing clays.

MARTIN K. WEBER.
CHARLES R. NELSON.

No references cited.